Figure 1:
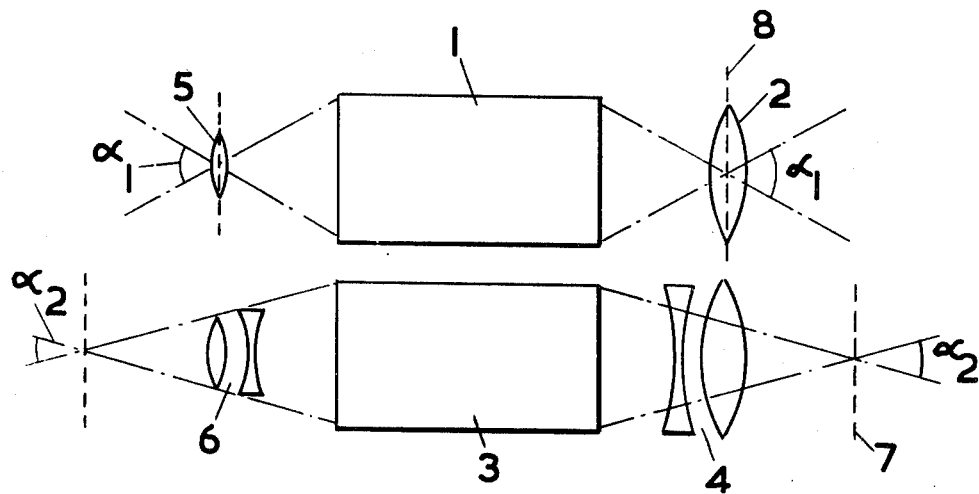

United States Patent [19]

Cox

[11] 4,037,921
[45] July 26, 1977

[54] NIGHT VISION APPARATUS

[75] Inventor: Alan Frederick John Cox, Christchurch, England

[73] Assignee: The Secretary of State for Defence in Her Britannic Majesty's Government of the United Kingdom of Great Britain and Northern Ireland, London, England

[21] Appl. No.: 695,628

[22] Filed: June 14, 1976

[30] Foreign Application Priority Data

June 17, 1975 United Kingdom ............... 25831/75

[51] Int. Cl.² ............................................. G02B 23/12
[52] U.S. Cl. ................................. 350/36; 250/213 R; 350/145
[58] Field of Search ..................... 250/213 R, 213 VT; 350/20, 31, 36, 145

[56] References Cited

U.S. PATENT DOCUMENTS 3,200,250 8/1965 Bouwers ........................... 250/213 R
3,787,688 1/1974 Stone .............................. 250/213 VT Primary Examiner—John K. Corbin
Assistant Examiner—Matthew W. Koren
Attorney, Agent, or Firm—Pollock, Vande Sande & Priddy

[57] ABSTRACT

In night vision apparatus, a wide-angle view, and a narrow-angle but higher-resolution view, are observed simultaneously in superposed relationship to provide a composite view which is wide-angle, but has a higher-resolution part. Night vision goggles or binoculars have two optical channels, each with its objective lens system, image intensifier and eyepiece. One of the channels presents a wide-angle view of a scene to one eye and the other channel presents a higher-resolution view of a central portion of the scene to the other eye, both views having the same magnification. A degree of stereoscopy can be obtained in the central portion of the scene even though one eye is only receiving a low resolution view.

6 Claims, 2 Drawing Figures

NIGHT VISION APPARATUS

This invention relates to night vision apparatus using image intensifiers.

Night vision apparatus is available in which a scene is focussed onto an input of an image intensifier by a lens system and an eyepiece is provided for observing the intensified image produced by the image intensifier. If a wider field of view is required, for a given image intensifier, the scene is focussed onto the input of the image intensifier with a smaller magnification, so that more of the scene is focussed onto the input, and the intensified image is viewed with a correspondingly higher magnification, so as to keep the overall magnification of the apparatus the same. A problem arises because, since more of the scene is being squeezed into the image intensifier, and since the resolving power of the image intensifier is limited, the overall resolving power of the apparatus is degraded as the field of view is increased. The field of view can be increased without loss of resolving power by using a larger image intensifier, but that will necessarily introduce additional problems of size, weight and cost.

A case where the problems discussed above arise in a particularly acute form is that of night-vision goggles for helicopter pilots. These goggles have to be mounted on the head of the pilot, so the size and weight must be kept to a minimum, but on the other hand the pilot needs a reasonably wide field of view and also enough resolving power to be able to distinguish, for example, electric power lines. A compromise between these conflicting requirements must be made and present night-vision goggles are far from ideal.

It is an object of the present invention to provide night vision apparatus which provides a wide-angle view and, at the same time, a high-resolution view.

According to my invention there is provided night-vision apparatus comprising means for providing two intensified images of a scene, one image providing a comparatively wide-angle view of the scene and the other image providing a comparatively narrow-angle view of the scene, but with better resolution, and observation means for enabling both intensified images to be observed simultaneously in superposed relationship with the same overall magnification.

Preerably the narrow-angle view is of a part of the scene approximately at the center of the wide-angle view.

The means for providing two intensified images may comprise a first optical channel and a second optical channel, each optical channel comprising an image intensifier and focussing means for focussing an image of the scene onto an input of the image intensifier, the focussing means in the second optical channel providing a higher magnification than the focussing means in the first optical channel.

In a particularly simple and advantageous arrangement the two optical channels are arranged side by side with their focussing means adjacent and the observation means comprises two eyepieces, one for each channel, arranged so that a person can observe the intensified images simultaneously, one with each eye. The overall magnification of the two optical channels together with their respective eyepieces may be equal to unity, in which case the apparatus forms a pair of night-vision goggles arranged to provide a wide-angle view to one eye and a narrow-angle high-resolution view to the other eye, or it may be greater than unity in which case the apparatus forms a pair of night-vision binoculars similarly arranged. In either case, as well as providing a high-resolution view of part of the scene at the same time as providing some wide-angle vision, there is the added advantage that the high-resolution view is stereoscopic, provided the resolution is high enough. This is a surprising result because only one eye is receiving the high-resolution view; the other eye is receiving a lower-resolution view. I find, however, that while degrading the resolution of the views received by both eyes destroys stereopsis, degrading the resolution of the view applied to one eye has much less effect.

Figure 2:
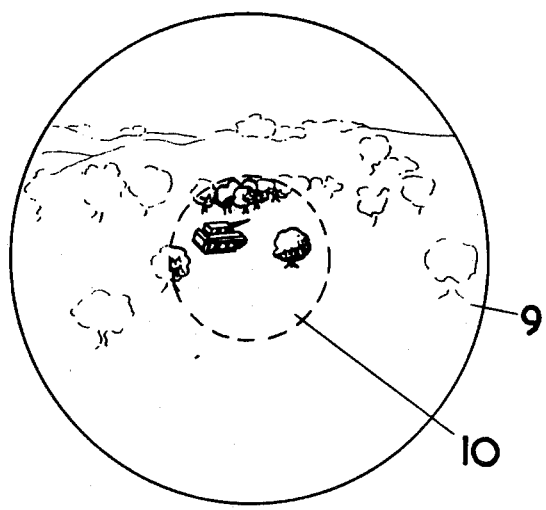

An embodiment of my invention will now be described by way of example with reference to the accompanying drawings, of which:

FIG. 1 is a schematic drawing showing the optical arrangement of a pair of night-vision goggles according to my invention, and FIG. 2 is a drawing of a scene as observed using the goggles of FIG. 1.

In FIG. 1 an image intensifier 1 and an objective lens assembly 2 form the first optical channel and an image intensifier 3 and an objective lens assembly 4 form the second optical channel. Associated with the first and second optical channels are eyepieces 5 and 6 respectively. The objective lens assemblies 2 and 4, the image intensifiers 1 and 3 and the eyepieces 5 and 6 are arranged as in conventional night-vision goggles, the only differences being that in the goggles according to my invention the two objective lens assemblies 2 and 4 are not identical and the two eyepieces 5 and 6 are not identical. The lens assembly 4 in the second channel is a telephoto lens assembly, so that while the two objective lens assemblies 2 and 4 are adjacent, so as to give images having perspectives appropriate to two binocular channels, the distance between the second principal plane 7 of the objective lens assembly 4 and the image intensifier 3 in the second channel is greater than the distance between the second principal plane 8 of the objective lens assembly 2 and the image intensifier 1 in the first channel. The magnification produced by the objective lens assembly 4 is thus greater than that of the objective lens assembly 2, so the angular field of view $\alpha_2$ in the second channel is less than the angular field of view $\alpha_1$ in the first channel. The difference between the eyepieces 5 and 6 is similar, with the eyepiece 6 in the second channel having a lower magnification than the eyepiece 5 in the first channel. The overall magnifications in the two channels are equal to one another, and both equal to unity.

When the goggles of FIG. 1 are used, one eye is presented via the second channel, with a comparatively wide-angle view 9 of a scene as shown in FIG. 2. The other eye is presented with a narrow-angle view 10 of a central part of the scene with better resolution. Provided the goggles are properly aligned and the user has normal eyesight, he will automatically fuse the two views 9 and 10. The view of the central part of the scene is stereoscopic.

A number of modifications of the embodiment described will be apparent to a person skilled in the relevant art. For example the objective lens assemblies and eyepieces have been depicted as simple lenses and doublets, but it is well known in the optical art to use higher order multiplets to reduce aberrations. Also, since for some users it will be more convenient to receive the wide-angle view with the left eye and the high-resolution view with the right eye, whereas for other users it will be more convenient to receive the wide-angle view with the right eye, and the high-resolution view with the left eye provision may be made to interchange the channels to suit the convenience of different users.

I claim:

1. Night vision apparatus comprising means for providing two intensified images of a scene, one of said images providing a comparatively wide-angle view of said scene, and the other of said images providing a comparatively narrow-angle view of said scene, but with better resolution, and observation means for enabling both of said intensified images to be observed simultaneously in superposed relationship with the same overall magnification.

2. Apparatus as claimed in claim 1 wherein said means for providing two intensified images comprises a first optical channel and a second optical channel, each of said optical channels comprising an image intensifier and focussing means for focussing an image of said scene onto an input of said image intensifier, the focussing means in said second channel providing a higher magnification than the focussing means in said first optical channel.

3. Night-vision goggles comprising apparatus as claimed in claim 2 wherein said two optical channels are arranged side by side with their focussing means adjacent and wherein said observation means comprises two eyepieces, one for each of said channels, arranged to enable a person to observe said intensified images simultaneously one with each eye, the overall magnifications of said channels, together with their respective eyepieces, being approximately equal to unity.

4. Night-vision goggles as claimed in claim 3 wherein said narrow-angle view is of a part of said scene approximately at the center of said wide-angle view.

5. Night-vision binoculars comprising apparatus as claimed in claim 2 wherein said two optical channels are arranged side by side with their focussing means adjacent and wherein said observation means comprises two eyepieces, one for each of said channels, arranged to enable a person to observe said intensified images simultaneously, one with each eye, the overall magnifications of said channels, together with their respective eyepieces, being greater than unity.

6. Night-vision bincoulars as claimed in claim 5 wherein said narrow-angle view is of a part of said scene approximately at the center of said wide-angle view.

* * * * *